United States Patent
Park et al.

(10) Patent No.: US 11,425,727 B2
(45) Date of Patent: Aug. 23, 2022

(54) TECHNIQUES FOR REPORTING USER EQUIPMENT (UE) PANEL-RELATED INFORMATION

(71) Applicant: QUALCOMM Incorporated, San Diego, CA (US)

(72) Inventors: Sungwoo Park, San Diego, CA (US); Mostafa Khoshnevisan, San Diego, CA (US); Wooseok Nam, San Diego, CA (US); Tao Luo, San Diego, CA (US); Jing Sun, San Diego, CA (US); Xiaoxia Zhang, San Diego, CA (US); Arumugam Chendamarai Kannan, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/909,442

(22) Filed: Jun. 23, 2020

(65) Prior Publication Data
US 2021/0037529 A1    Feb. 4, 2021

Related U.S. Application Data

(60) Provisional application No. 62/882,374, filed on Aug. 2, 2019.

(51) Int. Cl.
*H04W 56/00* (2009.01)
*H04W 72/04* (2009.01)
(Continued)

(52) U.S. Cl.
CPC ......... *H04W 72/0493* (2013.01); *H04W 8/24* (2013.01); *H04W 52/0229* (2013.01);
(Continued)

(58) Field of Classification Search
CPC . H04W 72/0493; H04W 76/15; H04W 76/27; H04W 8/24; H04W 52/0229; H04W 72/042; H04W 80/02
(Continued)

(56) References Cited

U.S. PATENT DOCUMENTS

2020/0145062 A1* 5/2020 Jung ................ H04W 48/20
2020/0336928 A1* 10/2020 Seo ................. H04W 56/001
(Continued)

OTHER PUBLICATIONS

CATT: "Offline Discussion on UE Power Saving Schemes", 3GPP Draft, R1-1814327, Offline 2 of AI-7.2.9.2.1 UE Adaptation Power Saving Schemes, 3rd Generation Partnership Project (3GPP), Mobile Competence Centre, 650, Route Des Lucioles, F-06921 Sophia-Antipolis, vol. RAN WG1, No. Spokane, U.S.A, Nov. 12, 2018-Nov. 16, 2018, Nov. 19, 2018 (Nov. 19, 2018), XP051494780, 5 Pages, Retrieved from the Internet; URL: http://www.3gpp.org/ftp/tsg%5Fran/WG1%5FRL1/TSGR1%5F95/Docs/R1%2D1814327%2Ezip. [retrieved on Nov. 19, 2018] the whole document.

(Continued)

*Primary Examiner* — Sai Ming Chan
(74) *Attorney, Agent, or Firm* — Dalei Dong; ArentFox Schiff LLP

(57) ABSTRACT

A user equipment (UE) transmits, to a base station, a transmission configuration indication (TCI) report indicating associations between a plurality of TCIs and one or more UE panels of the UE; receives, from the base station in response to the TCI report, a TCI configuration message indicating a first set of TCI of the plurality of TCIs for a physical downlink control channel (PDCCH) transmission; and skips monitoring, based at least in part on the TCI configuration message, a control resource set (CORESET) associated with a second set of TCI of the plurality of TCIs.

30 Claims, 11 Drawing Sheets

(51) Int. Cl.
  *H04W 8/24* (2009.01)
  *H04W 52/02* (2009.01)
  *H04W 76/27* (2018.01)
  *H04W 80/02* (2009.01)
  *H04W 76/15* (2018.01)

(52) U.S. Cl.
  CPC ......... *H04W 72/042* (2013.01); *H04W 76/15* (2018.02); *H04W 76/27* (2018.02); *H04W 80/02* (2013.01)

(58) Field of Classification Search
  USPC ........................................................ 370/329
  See application file for complete search history.

(56) References Cited

U.S. PATENT DOCUMENTS

| | | | | |
|---|---|---|---|---|
| 2021/0258813 | A1* | 8/2021 | Li | H04B 7/0695 |
| 2021/0314927 | A1* | 10/2021 | Noh | H04L 5/0053 |

OTHER PUBLICATIONS

International Search Report and Written Opinion—PCT/US2020/039431—ISA/EPO—dated Nov. 23, 2020.

Spreadtrum Communications: "Discussion on Multi-TRP transmission", 3GPP Draft, R1-1900711, Discussion on Multi-TRP transmission, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593558, 6 Pages, Retrieved from the Internet URL: http://www.3gpp.org/ftp/Meetings%5F3GPP%5FSYNC/RAN1/Docs/R1%2D1900711%2Ezip. [retrieved on Jan. 20, 2019] the whole document.

ASUSTEK: "Enhancements on Multiple TRP or Panel Transmission," 3GPP Draft, 3GPP Tsg Ran WG1 #96, R1-1903046, Mobile Competence Centre, 650, Route Des Lucioies, F-06921, Sophia-Antipolis Cedex, France, vol. Ran WG1, No. Athens, Greece; 20190225 - 20190301, Feb. 15, 2019, XP051 600742, 6 pages, Retrieved from the Internet: URL:http://www.3gpp.org/ftp/tsg%5Fran/WG1%5FRL1/TSGR1%5F96/Docs/R1%2D19b3046%2Ezip [retrieved on 2019-02-15] section 2.2, Proposal 3.

Zte, et al.,, "Consideration on Enhancement of TCI-State Mac Ce for Muliti-I RP Transmission", 3GPP Draft, R2-1906125, Mobile Competence Centre, 650, Route Des Lucioies, F-06921, S, vol. Ran WG2, No. Reno, USA, 20190513- 20190517, May 13, 2019, XP051 729601,7 Pages, Retrieved from the Internet: URL: http://www.3gpp.org/ftp/Meetings%5F3GPP%5FSYNC/RAN2/D0CS/R2%2D1906125%2Ezip. [retrieved on 2019-05-13] the whole document.

* cited by examiner

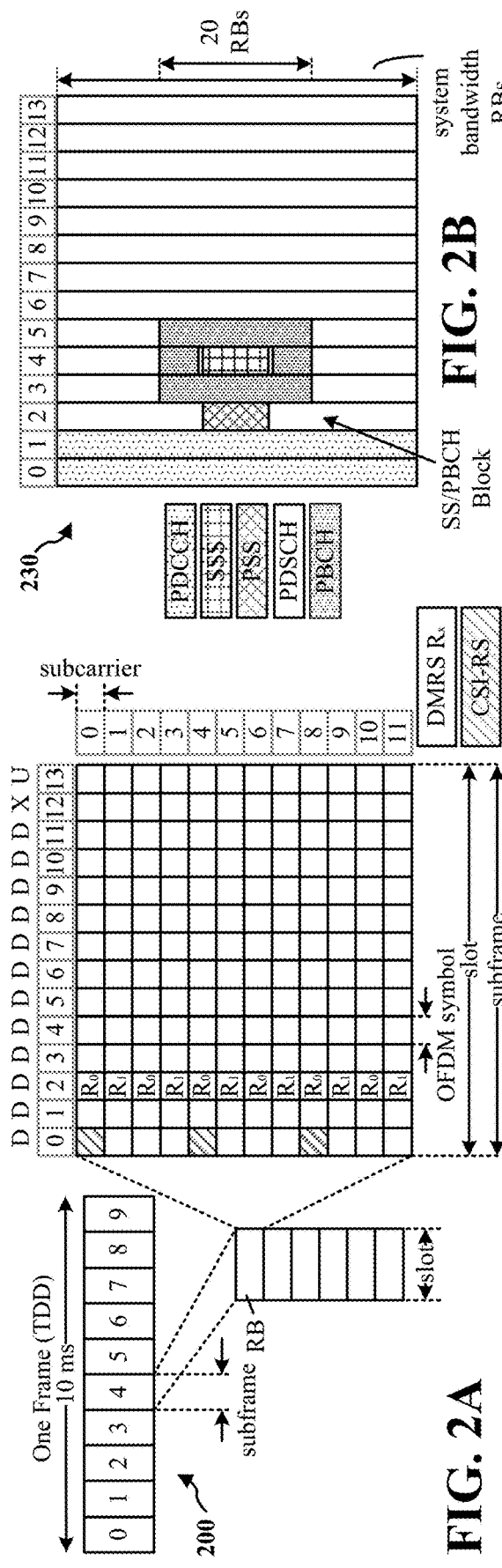
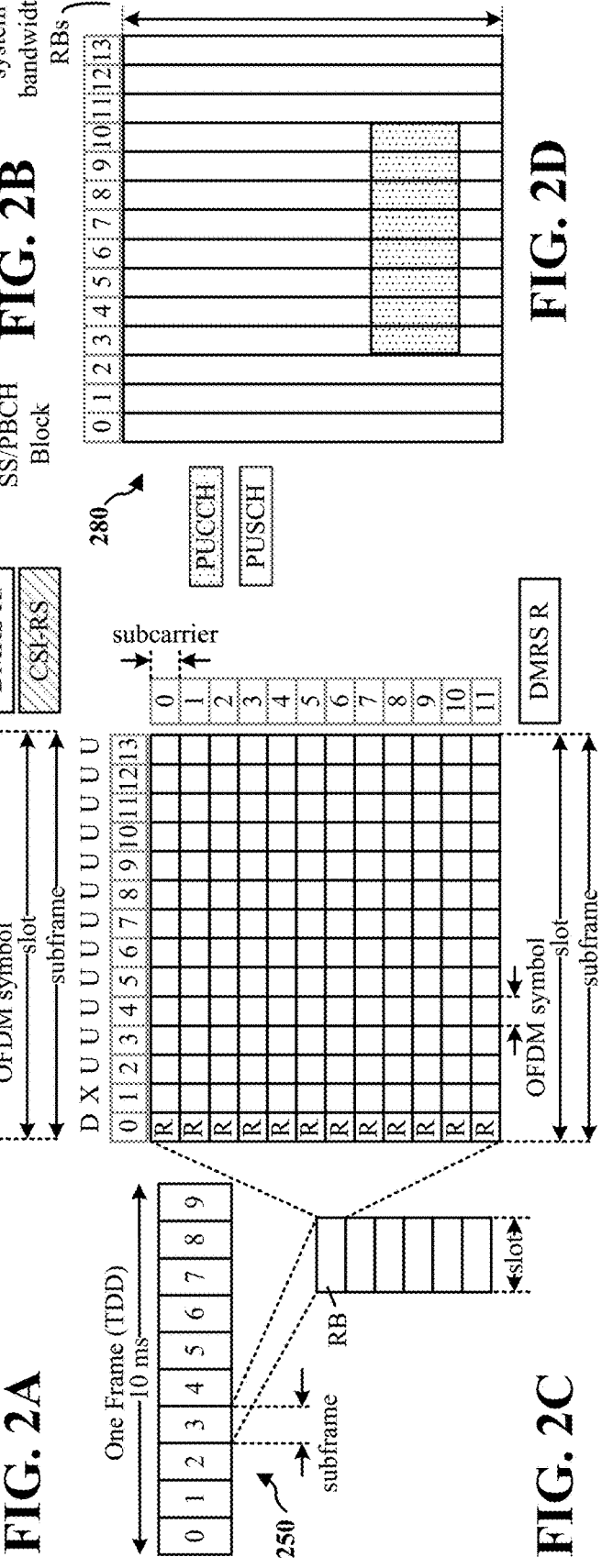

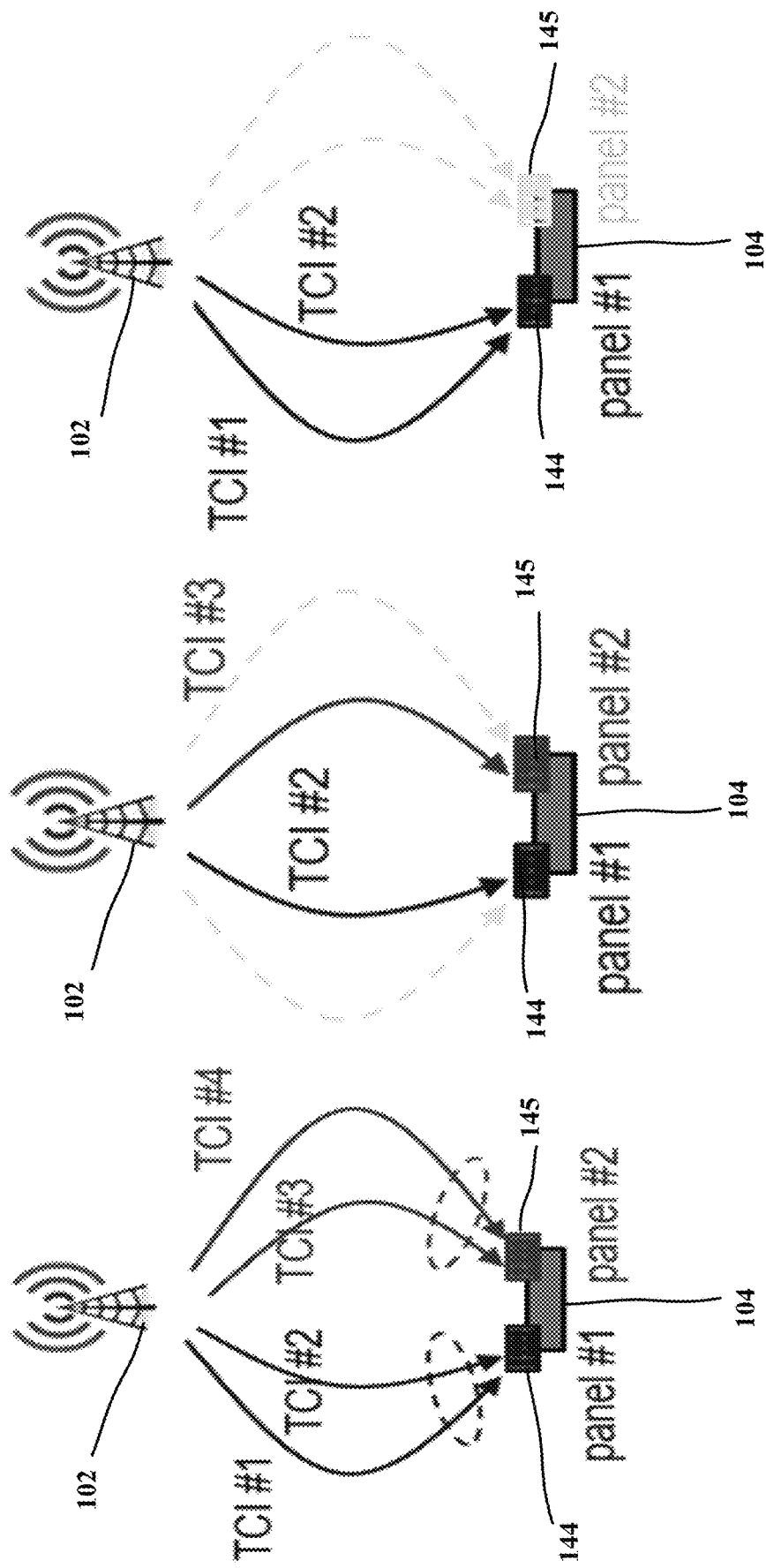

TECHNIQUES FOR REPORTING USER EQUIPMENT (UE) PANEL-RELATED INFORMATION

CROSS REFERENCE TO RELATED APPLICATION(S)

This application claims the benefit of U.S. Provisional Application Ser. No. 62/882,374, entitled "TECHNIQUES FOR REPORTING USER EQUIPMENT (UE) PANEL-RELATED INFORMATION" and filed on Aug. 2, 2019, which is expressly incorporated by reference herein in its entirety.

BACKGROUND

The present disclosure relates generally to wireless communication systems, and more particularly, to techniques for reporting user equipment (UE) panel-related information.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. In 3GPP Rel. 15, the UE can skip PDCCH monitoring to save power by using the connected DRX mode. Several other advanced power saving methods have been proposed for Rel. 16 such as wake-up signal and PDCCH skipping signal. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, computer-readable mediums, and apparatuses are provided.

In an aspect, a method of wireless communication by a user equipment (UE) includes transmitting, by the UE to a base station, a transmission configuration indication (TCI) report indicating associations between a plurality of TCIs and one or more UE panels of the UE; receiving, from the base station in response to the TCI report, a TCI configuration message indicating a first set of TCI of the plurality of TCIs for a physical downlink control channel (PDCCH) transmission; and skip monitoring, based at least in part on the TCI configuration message, a control resource set (CORESET) associated with a second set of TCI of the plurality of TCIs.

In a further aspect, a UE for wireless communication includes a memory and at least one processor coupled to the memory. The at least one processor is configured to transmit, by the UE to a base station, a TCI report indicating associations between a plurality of TCIs and one or more UE panels of the UE; receive, from the base station in response to the TCI report, a TCI configuration message indicating a first set of TCI of the plurality of TCIs for a PDCCH transmission; and skip monitor, based at least in part on the TCI configuration message, a CORESET associated with a second set of TCI of the plurality of TCIs.

In another aspect, an apparatus for wireless communication includes means for transmitting, by a UE to a base station, a TCI report indicating associations between a plurality of TCIs and one or more UE panels of the UE; means for receiving, from the base station in response to the TCI report, a TCI configuration message indicating a first set of TCI of the plurality of TCIs for a PDCCH transmission; and means for skip monitoring, based at least in part on the TCI configuration message, a CORESET associated with a second set of TCI of the plurality of TCIs.

In yet another aspect, a non-transitory computer-readable medium stores computer executable code. The code, when executed by a processor, causes the processor to transmit, by a UE to a base station, a TCI report indicating associations between a plurality of TCIs and one or more UE panels of the UE; receive, from the base station in response to the TCI report, a TCI configuration message indicating a first set of TCI of the plurality of TCIs for a PDCCH transmission; and skip monitoring, based at least in part on the TCI configuration message, a CORESET associated with a second set of TCI of the plurality of TCIs.

In a further aspect, a method of wireless communication by a base station includes receiving, by the base station from a UE, a TCI report indicating associations between a plurality of TCIs and one or more UE panels of the UE; and transmitting, to the UE in response to the TCI report, a TCI configuration message indicating a first set of TCI of the plurality of TCIs for a PDCCH transmission.

In another aspect, a base station for wireless communication includes a memory and at least one processor coupled to the memory. The at least one processor is configured to receive, by the base station from a UE, a TCI report indicating associations between a plurality of TCIs and one or more UE panels of the UE; and transmit, to the UE in response to the TCI report, a TCI configuration message indicating a first set of TCI of the plurality of TCIs for a PDCCH transmission.

In a further aspect, an apparatus for wireless communication includes means for receiving, by a base station from a UE, a TCI report indicating associations between a plurality of TCIs and one or more UE panels of the UE; and means for transmitting, to the UE in response to the TCI report, a TCI configuration message indicating a first set of TCI of the plurality of TCIs for a PDCCH transmission.

In yet another aspect, a non-transitory computer-readable medium stores computer executable code. The code, when executed by a processor, causes the processor to receive, by a base station from a UE, a TCI report indicating associations between a plurality of TCIs and one or more UE panels of the UE; and transmit, to the UE in response to the TCI report, a TCI configuration message indicating a first set of TCI of the plurality of TCIs for a PDCCH transmission.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Some further example implementations are provided below.

An example method of wireless communication for a user equipment (UE), including transmitting, by the UE to a base station, a transmission configuration indication (TCI) report indicating associations between a plurality of TCIs and one or more UE panels of the UE; receiving, from the base station in response to the TCI report, a TCI configuration message indicating a first set of TCI of the plurality of TCIs for a physical downlink control channel (PDCCH) transmission; and skip monitoring, based at least in part on the TCI configuration message, a control resource set (CORESET) associated with a second set of TCI of the plurality of TCIs.

The above method of wireless communication for a user equipment (UE), wherein the first set of TCI is different than the second set of TCI.

Any of the above methods of wireless communication for a user equipment (UE), wherein the TCI report indicates that at least one TCI of the plurality of TCIs is associated with more than one UE panel.

Any of the above methods of wireless communication for a user equipment (UE), wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel, and wherein the confidence level identifies a UE confidence in reliably receiving the first TCI using only the first UE panel.

Any of the above methods of wireless communication for a user equipment (UE), wherein the TCI report includes a UE capability indicating whether the UE is capable of a simultaneous reception of one or more CORESETs of one or more TCIs of the plurality of TCIs via more than one UE panel of the one or more UE panels.

Any of the above methods of wireless communication for a user equipment (UE), wherein the UE is capable of reception of one or more CORESETs of a single TCI of the plurality of TCIs via one of the one or more UE panels, wherein the UE capability indicates that the UE is incapable of the simultaneous reception.

Any of the above methods of wireless communication for a user equipment (UE), wherein the UE is capable of searching CORESETs corresponding to only one TCI for PDCCH monitoring by using multiple UE panels, wherein the UE capability indicates that the UE is capable of the simultaneous reception.

Any of the above methods of wireless communication for a user equipment (UE), wherein the UE is capable of searching CORESETs corresponding to multiple TCIs for PDCCH monitoring by using multiple UE panels, wherein the UE capability indicates that the UE is capable of the simultaneous reception.

Any of the above methods of wireless communication for a user equipment (UE), wherein the TCI configuration message indicates a TCI index of a TCI that is excluded from the first set of TCI.

Any of the above methods of wireless communication for a user equipment (UE), wherein the TCI configuration message indicates an excluded group index associated with one or more TCI indices of an excluded set of TCI excluded from the first set of TCI, wherein the excluded group index corresponds to an excluded UE panel index, wherein the skip monitoring includes skip monitoring responsive to at least based on the excluded group index.

Any of the above methods of wireless communication for a user equipment (UE), wherein receiving the TCI configuration message includes receiving within a signaling of TCI configurations via radio resource control (RRC).

Any of the above methods of wireless communication for a user equipment (UE), wherein receiving the TCI configuration message includes receiving within signaling of activation/deactivation of one or more corresponding TCIs via media access control (MAC) control element (CE).

Any of the above methods of wireless communication for a user equipment (UE), wherein receiving the TCI configuration message includes receiving a dynamic indication via a downlink control information (DCI).

Any of the above methods of wireless communication for a user equipment (UE), wherein the dynamic indication includes a PDCCH skipping signal.

Any of the above methods of wireless communication for a user equipment (UE), wherein receiving the TCI configuration message includes receiving within a signaling configured for UE power saving.

Any of the above methods of wireless communication for a user equipment (UE), further including: determining whether to use a power saving mode or a high performance mode; and wherein the skip monitoring is performed in response to determining to use the power saving mode.

A user equipment (UE) for wireless communication, including a memory storing instructions; and at least one processor coupled to the memory and configured to execute the instructions to perform the operations of any of the above methods of wireless communication for a user equipment (UE).

An apparatus for wireless communication, including means for performing the operations of any of the above methods of wireless communication for a user equipment (UE).

A computer-readable medium including storing computer executable code, the code when executed by a processor causes the processor to perform the operations of any of the above methods of wireless communication for a user equipment (UE).

An example method for wireless communication for a base station, including receiving, by the base station from a user equipment (UE), a transmission configuration indication (TCI) report indicating associations between a plurality of TCIs and one or more UE panels of the UE; and transmitting, to the UE in response to the TCI report, a TCI configuration message indicating a first set of TCI of the plurality of TCIs for a physical downlink control channel (PDCCH) transmission.

The above method for wireless communication for a base station, wherein the TCI report indicates that each TCI of the plurality of TCIs is associated with only one UE panel of the one or more UE panels.

Any of the above methods for wireless communication for a base station, wherein the TCI report indicates that at least one TCI of the plurality of TCIs is associated with more than one UE panel.

Any of the above methods for wireless communication for a base station, wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel, and wherein the confidence level identifies a UE confidence in reliably receiving the first TCI using only the first UE panel, the method further including: applying the confidence level in selecting the first set of TCI for the PDCCH transmission based on a tradeoff between reliability and power saving.

Any of the above methods for wireless communication for a base station, wherein the TCI report includes a UE capability indicating whether the UE is capable of a simultaneous reception of one or more CORESETs of one or more TCIs of the plurality of TCIs via more than one UE panel of the one or more UE panels.

Any of the above methods for wireless communication for a base station, wherein the UE is capable of reception of one or more CORESETs of a single TCI of the plurality of TCIs via one of the one or more UE panels, wherein the UE capability indicates that the UE is incapable of the simultaneous reception.

Any of the above methods for wireless communication for a base station, wherein the UE is capable of searching CORESETs corresponding to only one TCI for PDCCH monitoring by using multiple UE panels, wherein the UE capability indicates that the UE is capable of the simultaneous reception.

Any of the above methods for wireless communication for a base station, wherein the UE is capable of searching CORESETs corresponding to multiple TCIs for PDCCH monitoring by using multiple UE panels, wherein the UE capability indicates that the UE is capable of the simultaneous reception.

Any of the above methods for wireless communication for a base station, further including: selecting the first set of TCI for the PDCCH transmission based at least on the UE capability and the associations between the plurality of TCIs and the one or more UE panels.

Any of the above methods for wireless communication for a base station, further including: selecting the first set of TCI for the PDCCH transmission further based on a data buffer, a channel status in a multiple transmit-receive point (multi-TRP) communication, or a trade-off between a power saving mode and a reliability mode.

Any of the above methods for wireless communication for a base station, wherein the TCI configuration message indicates a TCI index of a TCI that is excluded from the first set of TCI.

Any of the above methods for wireless communication for a base station, wherein the TCI configuration message indicates an excluded group index associated with one or more TCI indices of an excluded set of TCI excluded from the first set of TCI, wherein the excluded group index corresponds to an excluded UE panel index.

Any of the above methods for wireless communication for a base station, wherein transmitting the TCI configuration message includes transmitting within a signaling of TCI configurations via radio resource control (RRC).

Any of the above methods for wireless communication for a base station, wherein transmitting the TCI configuration message includes transmitting within signaling of activation/deactivation of one or more corresponding TCIs via media access control (MAC) control element (CE).

Any of the above methods for wireless communication for a base station, wherein transmitting the TCI configuration message includes transmitting a dynamic indication via a downlink control information (DCI).

Any of the above methods for wireless communication for a base station, wherein the dynamic indication includes a PDCCH skipping signal.

Any of the above methods for wireless communication for a base station, wherein transmitting the TCI configuration message includes transmitting within a signaling configured for UE power saving A base station for wireless communication, including a memory; and at least one processor coupled to the memory and configured to perform the operations of any of the above methods for wireless communication for a base station.

An apparatus for wireless communication, including means for performing the operations of any of the above methods for wireless communication for a base station.

A computer-readable medium storing computer executable code, the code when executed by a processor causes the processor to: perform the operations of any of the above methods for wireless communication for a base station.

BRIEF DESCRIPTION OF THE DRAWINGS

FIG. 2A is a diagram illustrating an example of a first 5G/NR frame for use in communication by the base stations and/or the UEs in FIG. 1, according to some aspects of the present disclosure.

FIG. 2B is a diagram illustrating an example of DL channels within a 5G/NR subframe for use in communication by the base stations and/or the UEs in FIG. 1, according to some aspects of the present disclosure.

FIG. 2C is a diagram illustrating an example of a second 5G/NR frame for use in communication by the base stations and/or the UEs in FIG. 1, according to some aspects of the present disclosure.

FIG. 2D is a diagram illustrating an example of UL channels within a 5G/NR subframe for use in communication by the base stations and/or the UEs in FIG. 1, according to some aspects of the present disclosure.

FIG. 5A is a diagram illustrating a fourth example communication configuration between a base station and a UE with multiple UE panels, according to some aspects of the present disclosure.

FIG. 5B is a diagram illustrating a fifth example communication configuration between a base station and a UE with multiple UE panels, according to some aspects of the present disclosure.

FIG. 5C is a diagram illustrating a sixth example communication configuration between a base station and a UE with multiple UE panels, according to some aspects of the present disclosure.

DETAILED DESCRIPTION

Figure 1:
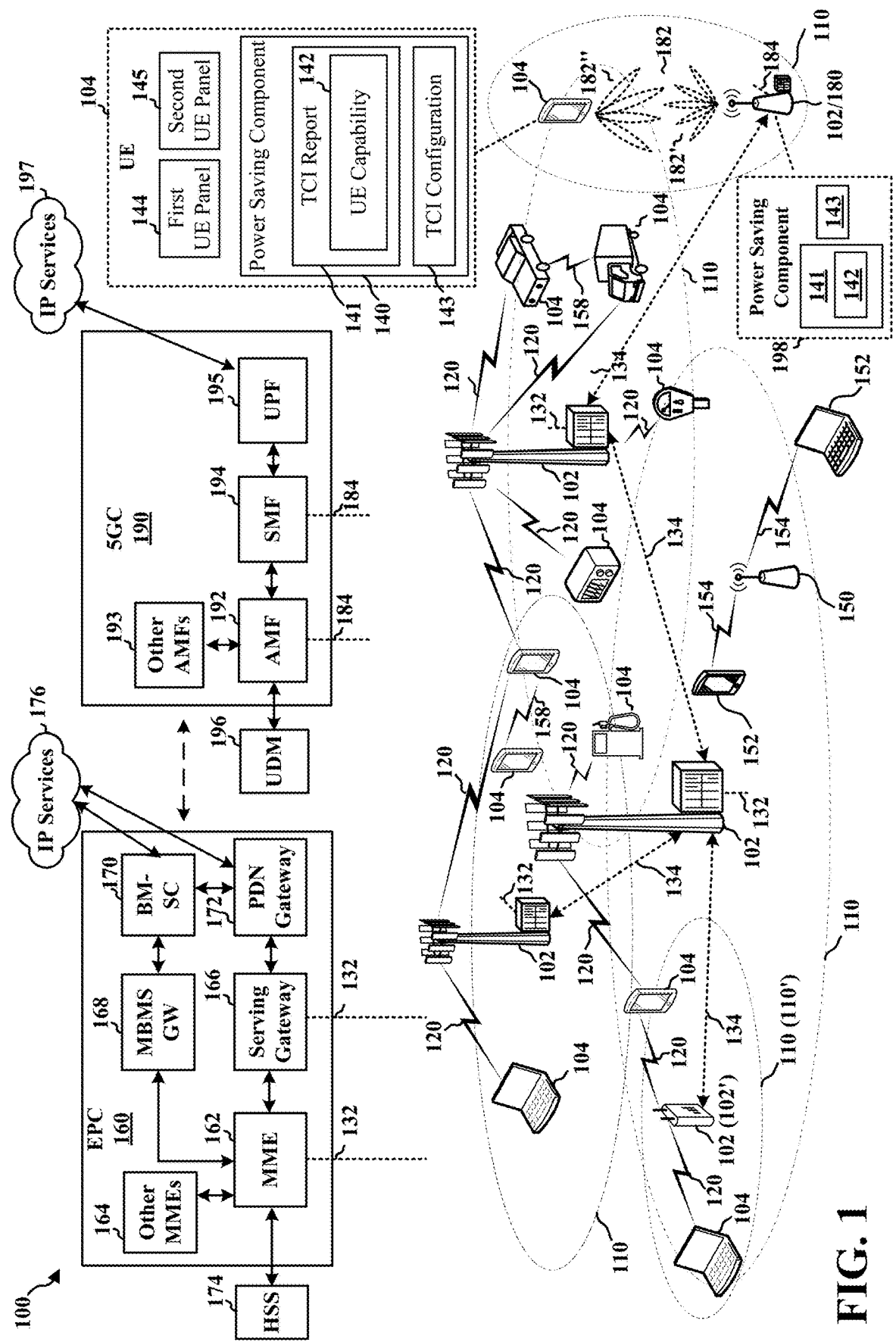
FIG. 1 is a diagram illustrating an example of a wireless communications system and an access network, including components for user equipment (UE) power saving, for example, by reporting UE panel-related information to a base station, according to some aspects of the present disclosure.
Figure 3A:
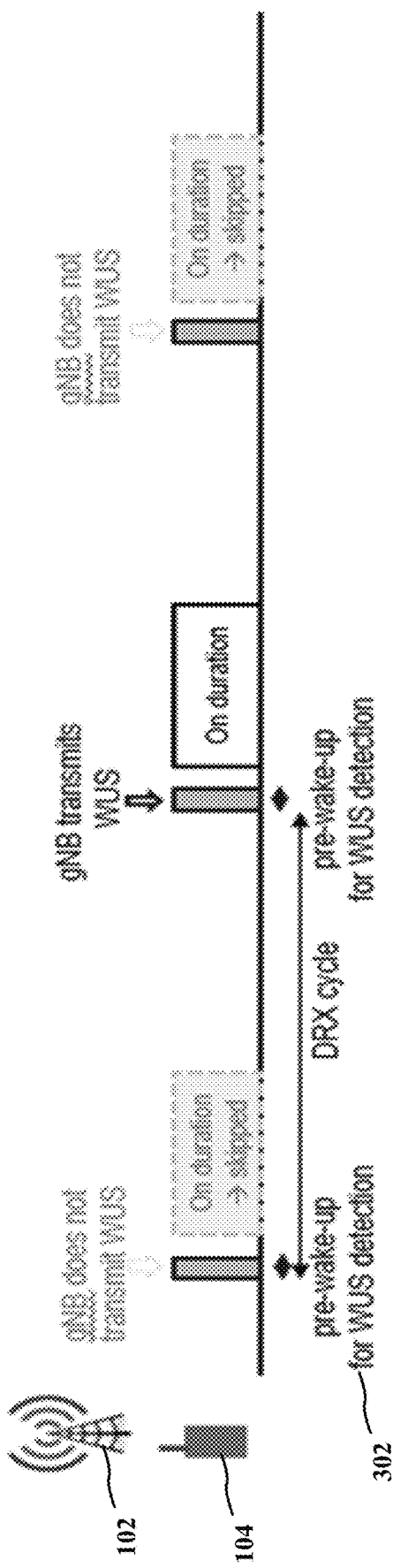
FIG. 3A is a diagram illustrating a first example discontinuous reception (DRX) cycle, according to some aspects of the present disclosure.
Figure 3B:
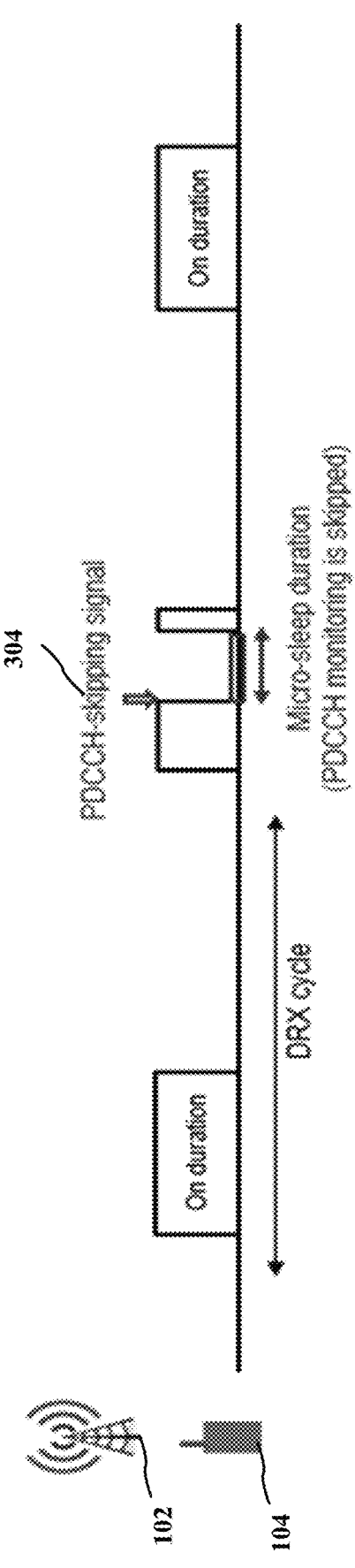
FIG. 3B is a diagram illustrating a second example DRX cycle, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Aspects of the present disclosure allow for improved user equipment (UE) power saving by taking into consideration multiple UE panels (e.g., each panel including a transceiver chain, one or more antennas, etc.), for example, in a multiple transmission configuration indication (multi-TCI) communication or a multiple transmit reception point (multi-TRP) communication. In an aspect, for example, a UE may report UE panel-related information (e.g., indicating associations between TCIs and UE panels) to a base station. The UE may then receive TCI configuration information from the base station in response, indicating which TCIs may be used for physical downlink control channel (PDCCH) transmissions. The UE may then skip monitoring of control resource sets (CORESETs) of one or more TCIs and turn off one or more corresponding UE panels to save power.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including a UE 104 that reports UE panel-related information to a base station 102 (e.g., a gNB) in order to implement UE power saving functionality. For example, in an aspect, the UE 104 includes a power saving component 140 that transmits a TCI report 141 to the base station 102, where the TCI report 141 indicates information about the associations between a number of TCIs and one or more UE panels of the UE 104 (e.g., a first UE panel 144 and a second UE panel 145). The TCI report 141 may also indicate UE capability 142, e.g., whether the UE 104 is capable of simultaneous reception of one or more CORESETs of one or more TCIs via more than one UE panel. In response to the TCI report 141, the base station may transmit a TCI configuration 143 to the UE 104. For example, in an aspect, the base station 102 includes a power saving component 198 that determines the TCI configuration 143 based on the TCI report 141, where the TCI configuration indicates one or more TCIs that may be used for physical downlink control channel (PDCCH) transmission. Further details of the operation of the power saving component 140 of the UE 104 and the power saving component 198 of the base station 102 are described below with reference to FIGS. 2A-2D, 3A, 3B, 4A-4C, 5A-5C, and 6-11.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In LTE and NR (e.g., Release 15), connected discontinuous transmission (DRX) allows a UE to make signaling-free transitions between sleep and awake states. The gNB schedules PDCCH/PDSCH transmissions only during the ON duration cycle, and the UE monitors PDCCH (e.g., UE is awake) only during the ON duration cycle (or until an inactivity timer expires). During the OFF duration cycle, the UE sleeps to save battery power. However, for beyond-NR (e.g., Release 16), a wake-up signal (WUS) and/or a PDCCH-skipping signal may be used to save UE battery further. For example, referring to FIG. 3A, if a WUS is not detected in the pre-wake-up stage 302, the UE 104 can skip the following ON duration cycle to save power further. However, referring to FIG. 3B, the UE 104 can go into the sleep mode even during the ON duration cycle if the UE 104 receives the PDCCH-skipping signal 304 from the gNB 102 which knows the downlink buffer status. For example, upon receiving the PDCCH-skipping signal 304, the UE 104 may go into sleep for a micro-sleep duration and skip PDCCH monitoring over the micro-sleep duration.

Figures 4A, 4B, 4C:
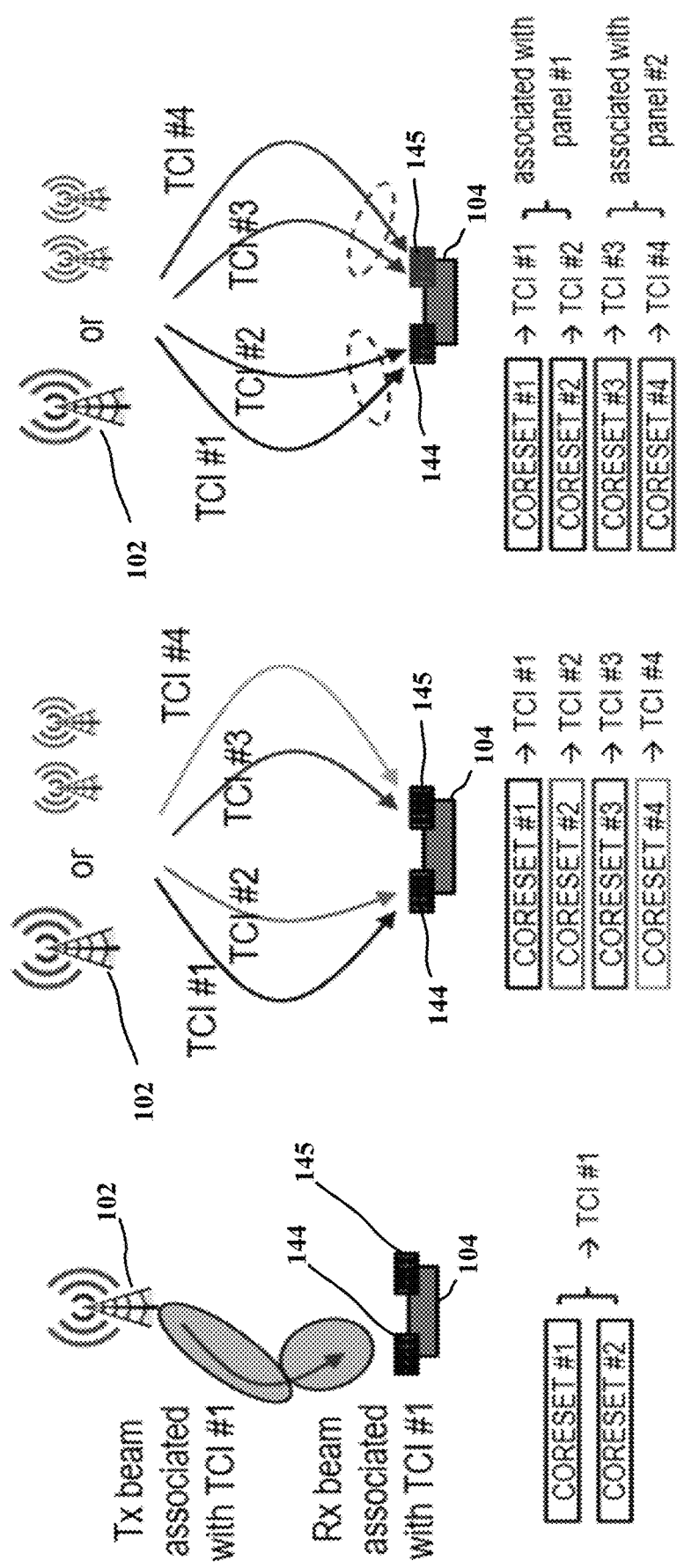
FIG. 4A is a diagram illustrating a first example communication configuration between a base station and a UE with multiple UE panels, according to some aspects of the present disclosure.
FIG. 4B is a diagram illustrating a second example communication configuration between a base station and a UE with multiple UE panels, according to some aspects of the present disclosure.
FIG. 4C is a diagram illustrating a third example communication configuration between a base station and a UE with multiple UE panels, according to some aspects of the present disclosure.

Referring to FIG. 4A, in a single TCI communication, the base station 102 may use a transmit beam associated with a first TCI, and the UE 104 may use a receive beam associated with the first TCI. The UE 104 monitors PDCCHs by searching the CORESETs associated with the same TCI (e.g., CORESETs 1 and 2 are both associated with the first TCI). In this case, the power saving signals do not need to include the TCI index since only a single TCI is used. Further, the UE panels 144 and 145 are transparent to the gNB 102 (e.g., the base station does not need to know how many UE panels are used on the UE side, how the UE panels are associated with different TCIs, etc.). Accordingly, the UE 104 does need to report the UE panel-related information to the gNB 102.

Referring to FIG. 4B, in a multi-TCI communication (including multi-TRP communication), the gNB 102 uses multiple TCIs. Each TCI is associated with a respective CORESET, and the UE 104 monitors PDCCHs by searching the CORESETs associated with the different TCIs. In this case, the power saving signals may need to include the TCI index (e.g., per-TCI power saving signal). For example, in one non-limiting aspect, the gNB 102 may indicate to the UE 104 to skip monitoring CORESETs #1 and #2 associated with TCIs #1 and #2. The gNB 102 may make such indication using a power saving signal, such as a WUS signal or a PDCCH skipping signal. The UE panels 144 and 145 are still transparent to the gNB 102, meaning the UE 104 does need to report the UE panel-related information and the gNB 102 does not need to know UE panel-related information.

Referring to FIG. 4C, in a multi-TCI communication (including multi-TRP communication) with UE panel index reporting, the UE 104 monitors PDCCHs by searching the CORESETs associated with different TCIs. The power saving signals may need to include the TCI index (e.g., per-TCI power saving signal). Alternatively, the power saving signals (e.g., per-panel PDCCH-skipping signal) may need to include the group index (e.g., UE panel index). In this case the UE panels 144 and 145 are not transparent to the gNB 102, meaning the UE 104 needs to report the UE panel-related information.

In an aspect, in a multi-TCI communication (including multi-TRP communication), improved power saving is provided using a UE panel indication (e.g., with UE panel index reporting). That is, if the UE reports the UE panel-related information to the gNB, the gNB may be able to save UE power further. Referring to FIG. 5A, in one non-limiting aspect, for example, in single-TRP or multi-TRP communication, each UE panel (e.g., each one of the first UE panel 144 and the second UE panel 145) is associated with 2 TCIs exclusively (TCI #1 and #2 are associated with the first UE panel 144 and TCI #3 and #4 are associated with the second UE panel 145). In this example aspect, the gNB 102 uses all four TCIs, and UE 104 monitors the PDCCH associated with all four TCIs. However, in one non-limiting aspect, the gNB 102 may be able to reduce the power consumption at the UE 104 by using only two of the four TCIs so that the UE 104 can monitor PDCCH associated with only two of the four TCIs for power saving, as described below.

Referring to FIG. 5B, in one non-limiting aspect, for example, the gNB 102 may not know the UE panel-related information. Therefore, the gNB 102 may select TCI #2 and #3 without considering the association of different TCIs with UE panels 144 and 145, and hence the UE 104 needs to turn on both UE panels 144 and 145. However, referring to FIG. 5C, in another non-limiting aspect, for example, if the gNB 102 knows the UE panel-related information, the gNB 102 may select TCIs that are associated with a single UE panel. For example, the gNB 102 may select TCI #1 and #2 by considering the association of both of these two TCIs with the first UE panel 144. The UE 104 may then turn off the second UE panel 145 and save power.

In an aspect, for example, the UE 104 may decide about the association between different TCIs and different UE panels. In an aspect, for example, the UE 104 may change the associations between the TCIs and the UE panels and report the updated associations to the gNB 102. For example, in an aspect, referring to FIG. 5B, the UE 104 may change the TCI-panel associations to associate TCI #3 with the first UE panel 144. The UE 104 may then turn off the second UE panel 145.

In an aspect, the gNB 102 and/or the UE 104 may consider a trade-off between power saving and performance (e.g., reliability). For example, the configuration in FIG. 5A may provide better performance/reliability, while the configuration in FIG. 5C may provide better UE power saving. In an aspect, even when the gNB 102 does not know the UE panel-related information, the gNB 102 may select TCI #1 and #2 (as in FIG. 5C). Accordingly, there is no constraint on TCI selection, allowing for opportunistic power saving. In an aspect, even when the gNB 102 knows the UE panel-related information, the gNB 102 may select TCI #2 and #3 (as in FIG. 5B) by taking into consideration the trade-off between power saving and reliability.

Figure 6:
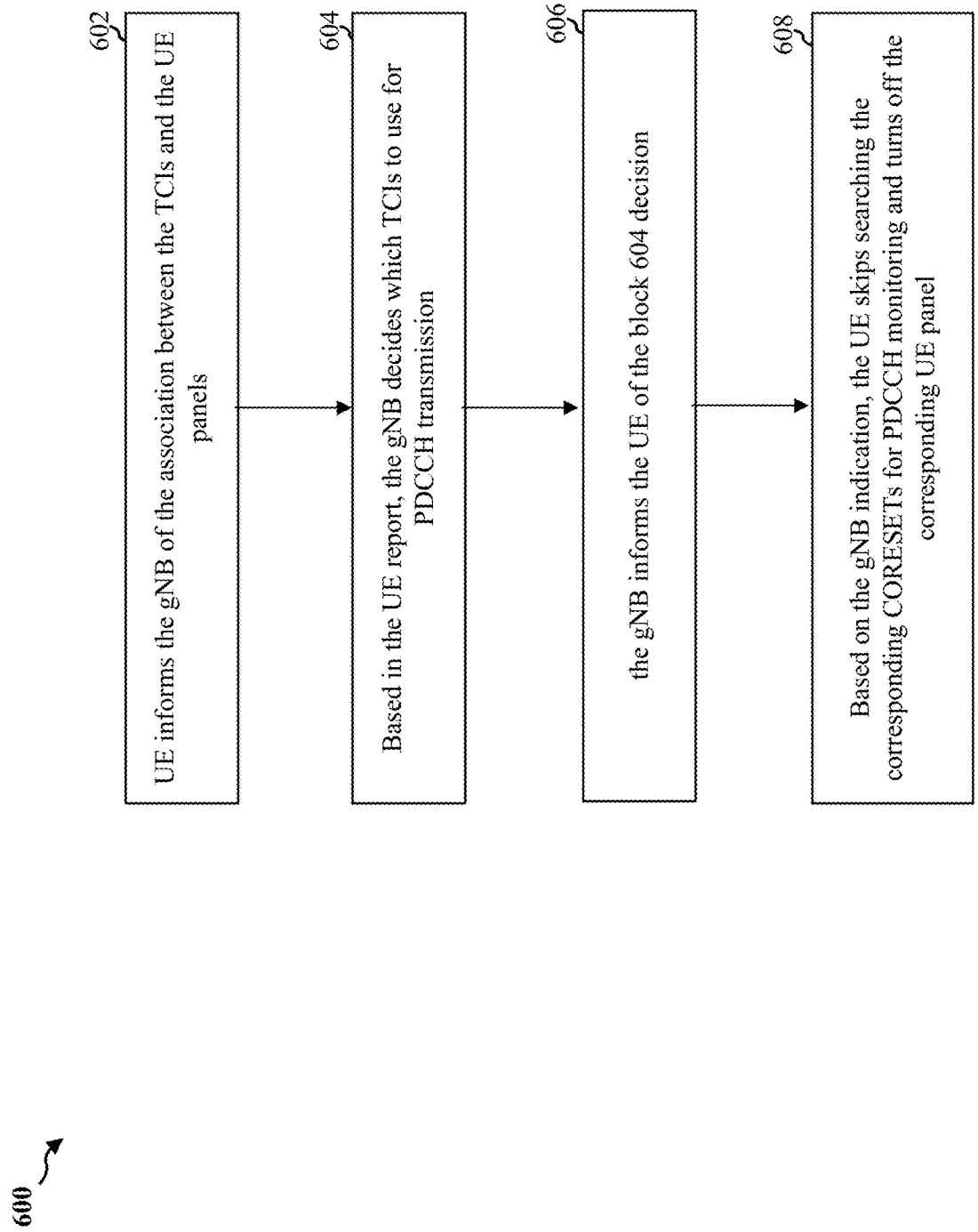
FIG. 6 is a flowchart of a first example method of wireless communication by a UE, according to some aspects of the present disclosure.

FIG. 6 is a flowchart of one non-limiting example method 600 of wireless communication that may be performed by the UE 104. At block 602, the UE 104 informs the gNB 102 of the association between the TCIs and the UE panels (e.g., 144 and 145). At block 604, based in the UE report, the gNB 102 decides which TCIs to use for PDCCH transmission. At block 606, the gNB 102 informs the UE 104 of the block 604 decision. At block 608, based on the gNB indication, the UE 104 skips searching the corresponding CORESETs for PDCCH monitoring and turns off the corresponding UE panel. Further details of each block are provided below.

In an aspect, for example, at block 602 in FIG. 6, the UE 104 informs the gNB 102 of the association between the TCIs and the UE panels 144 and 145. Regarding the association between TCIs and UE panels 144 and 145, in an aspect, for example, each TCI is associated with only one UE panel. Alternatively, in another aspect, for example, each TCI may be associated with multiple UE panels. Alternatively, a further aspect may include a combination of the aforementioned first and second options.

In one non-limiting aspect, for example, the UE 104 reports the following three types of information:
TCI #1 is associated with the first UE panel 144
TCI #1 is associated with the first UE panel 144 and the second UE panel 145
a soft metric about how confident the UE 104 is that TCI #1 can be received reliably using only the first UE Panel 144

Based on the soft metric above, the gNB 102 may take into consideration a trade-off between reliability and power-saving.

Regarding the UE capability of simultaneous reception via multiple UE panels, in one non-limiting aspect, for example, only one UE panel is active at a time, and simultaneous reception of CORESETs of different TCIs is not possible. Alternatively, in another non-limiting aspect, for example, all UE panels (or multiple UE panels) are active at a time. In this case, the UE 104 may search CORESETs corresponding to only one TCI for PDCCH monitoring by using multiple UE panels, or alternatively the UE may search CORESETs corresponding to multiple TCIs for PDCCH monitoring by using multiple UE panels (simultaneous reception).

In an aspect, the UE 104 reports the aforementioned UE capability information to the gNB 102.

In an aspect, for example, at block 604 in FIG. 6, based on the UE report, the gNB 102 decides which TCIs to use for PDCCH transmission. In an aspect, based on the UE capability and the TCI-panel associations reported from the UE 104 and optionally other information (e.g., data buffer, channel status in the multi-TRP case, etc.), the gNB 102 decides which TCIs to use for PDCCH transmission. In an aspect, the gNB 102 may need to take into consideration a trade-off between a power saving mode or a reliability mode.

In an aspect, for example, at block 606 in FIG. 6, the gNB 102 informs the UE 104 of the block 604 decision. Regarding the signaling information, for example, in an aspect, the gNB 102 may inform the UE 104 of the TCI index that can be skipped for PDCCH monitoring. Alternatively, the gNB 102 may inform the UE 104 of the group index (e.g., UE panel index) indicating the TCI indices that can be skipped for PDCCH monitoring.

In an aspect, the signaling method used by the gNB 102 to indicate the block 604 decision may be, for example, configuration of the TCIs via radio resource control (RRC), activation/deactivation of the corresponding TCIs via media access control (MAC) control element (CE), dynamic indication via DCI (e.g., PDCCH skipping signal), or other signals related to UE power saving (e.g., a WUS signal or a PDCCH skipping signal).

In an aspect, for example, at block 608 in FIG. 6, based on the gNB indication, the UE 104 skips searching the corresponding CORESET for PDCCH monitoring and turns off the corresponding UE panel. In an aspect, whether to turn on or off the UE panel depends on the UE decision (e.g., the UE does not always need to follow the decision of the gNB). In an aspect, for example, the UE 104 may decide which mode to use, e.g., the power saving mode versus the high performance mode.

Figure 7:
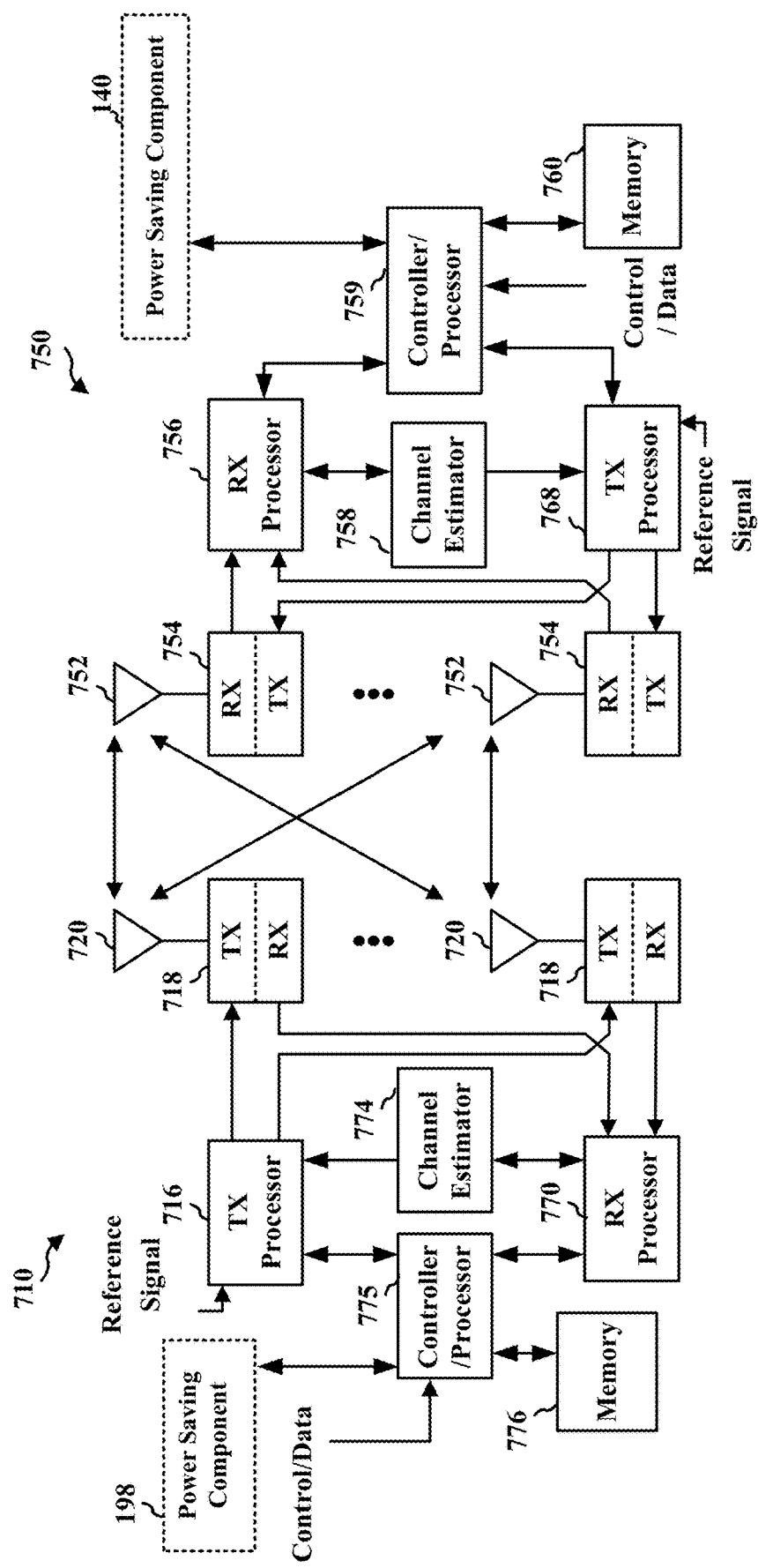
FIG. 7 is a diagram illustrating an example of a base station and a UE in an access network, according to some aspects of the present disclosure.

FIG. 7 is a block diagram of a base station 710 including a power saving component 198 in communication with a UE 750 including a power saving component 140 in an access network, where the base station 710 may be an example implementation of base station 102 and where UE 750 may be an example implementation of UE 104. In the DL, IP packets from the EPC 160 may be provided to a controller/processor 775. The controller/processor 775 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 775 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream may then be provided to a different antenna 720 via a separate transmitter 718TX. Each transmitter 718TX may modulate an RF carrier with a respective spatial stream for transmission.

At the UE 750, each receiver 754RX receives a signal through its respective antenna 752. Each receiver 754RX recovers information modulated onto an RF carrier and provides the information to the receive (RX) processor 756. The TX processor 768 and the RX processor 756 implement layer 1 functionality associated with various signal processing functions. The RX processor 756 may perform spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 710. These soft decisions may be based on channel estimates computed by the channel estimator 758. The soft decisions are then decoded and deinterleaved to recover the data and control signals that were originally transmitted by the base station 710 on the physical channel. The data and control signals are then provided to the controller/processor 759, which implements layer 3 and layer 2 functionality.

The controller/processor 759 can be associated with a memory 760 that stores program codes and data. The memory 760 may be referred to as a computer-readable medium. In the UL, the controller/processor 759 provides demultiplexing between transport and logical channels, packet reassembly, deciphering, header decompression, and control signal processing to recover IP packets from the EPC 160. The controller/processor 759 is also responsible for error detection using an ACK and/or NACK protocol to support HARQ operations.

Similar to the functionality described in connection with the DL transmission by the base station 710, the controller/processor 759 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The UL transmission is processed at the base station 710 in a manner similar to that described in connection with the receiver function at the UE 750. Each receiver 718RX receives a signal through its respective antenna 720. Each receiver 718RX recovers information modulated onto an RF carrier and provides the information to a RX processor 770.

The controller/processor 775 can be associated with a memory 776 that stores program codes and data. The memory 776 may be referred to as a computer-readable medium. In the UL, the controller/processor 775 provides demultiplexing between transport and logical channels, packet reassembly, deciphering, header decompression, control signal processing to recover IP packets from the UE 750. IP packets from the controller/processor 775 may be provided to the EPC 160. The controller/processor 775 is also responsible for error detection using an ACK and/or NACK protocol to support HARQ operations.

At least one of the TX processor 768, the RX processor 756, and the controller/processor 759 may be configured to perform aspects in connection with the power saving component 140 of FIG. 1.

At least one of the TX processor 716, the RX processor 770, and the controller/processor 775 may be configured to perform aspects in connection with the power saving component 198 of FIG. 1.

Figure 8:
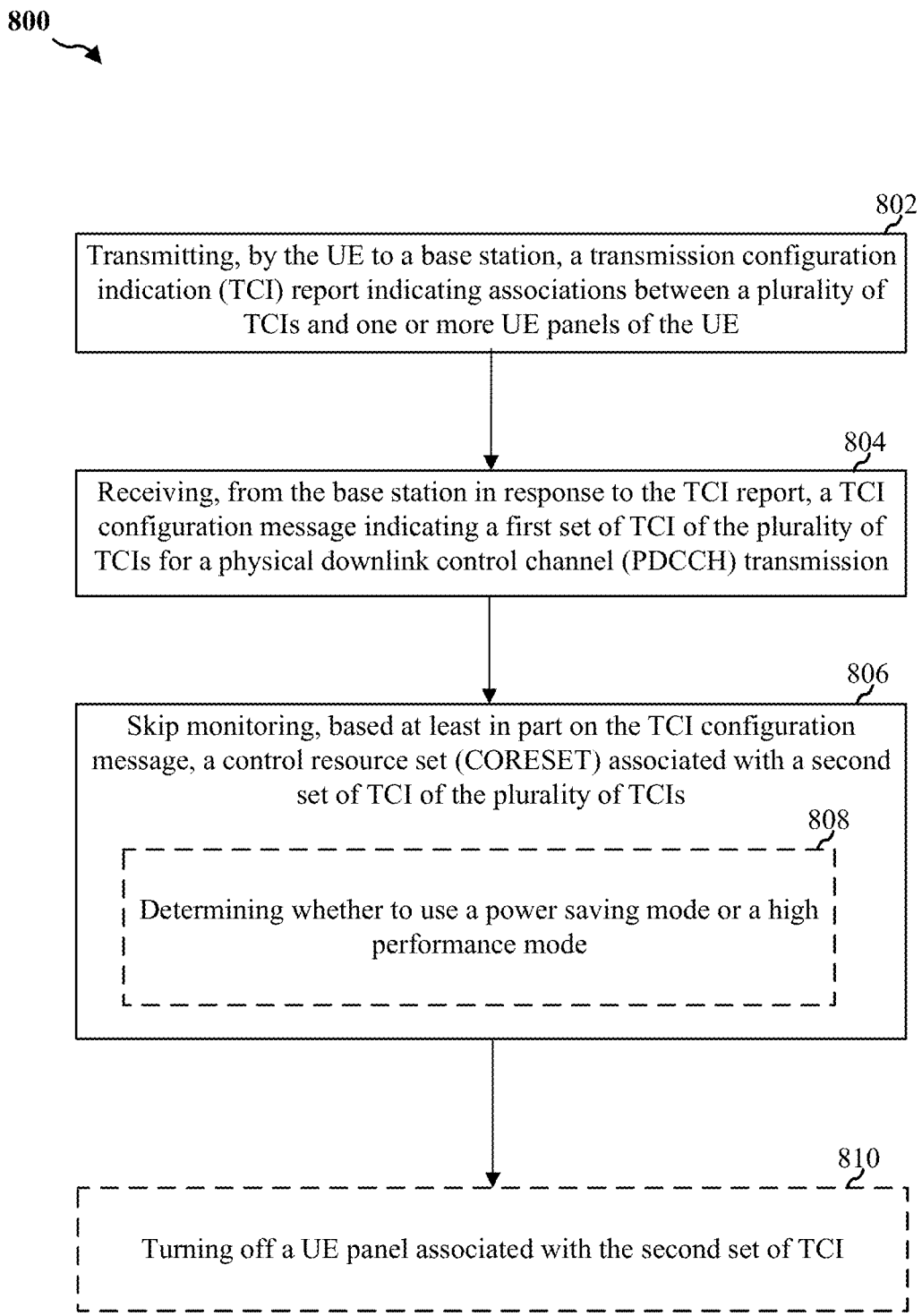
FIG. 8 is a flowchart of a second example method of wireless communication by a UE, according to some aspects of the present disclosure.

FIG. 8 is a flowchart of a method 800 of wireless communication that may be performed by a UE such as the UE 104 (FIG. 1 above or FIG. 10 below) or the UE 750 (FIG. 7 above). In an aspect, for example, the UE 104 or the UE 750 may perform the functions described in the method 800 using one or more of the components described with reference to FIG. 1 or FIG. 7 above or FIG. 10 below, such as power saving component 140, first UE panel 144, second UE panel 145, memory 760, antenna 752, TX processor 768, RX processor 756, controller/processor 759, modem 1014, UE panel(s) 146, antenna 1065, RF front end 1088, transceiver 1002, processor 1012, and/or memory 1016.

At 802, the method 800 includes transmitting, by the UE to a base station, a TCI report indicating associations between a plurality of TCIs and one or more UE panels of the UE. For example, in an aspect, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may transmit a TCI report to the base station 102, where the TCI report indicates associations between a plurality of TCIs and one or more UE panels of the UE 104, such as the first UE panel 144 and the second UE panel 145. For example, in an aspect, the TCI report may indicate that TCI #1 and TCI #2 are associated with the first UE panel 144, and TCI #3 and TCI #4 are associated with the second UE panel 145, as in FIGS. 5A-5C. Accordingly, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may provide means for transmitting a TCI report to the base station 102, where the TCI report indicates associations between a plurality of TCIs and one or more UE panels of the UE 104, such as the first UE panel 144 and the second UE panel 145.

At 804, the method 800 includes receiving, from the base station in response to the TCI report, a TCI configuration message indicating a first set of TCI of the plurality of TCIs for a PDCCH transmission. For example, in an aspect, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may receive a TCI configuration message from the base station 102 in response to the TCI report, where the TCI configuration message indicates a first set of TCI of the plurality of TCIs for a PDCCH transmission. For example, in an aspect, the TCI configuration message may indicate that TCI #1 and TCI #2 are used for PDCCH transmission, as in FIG. 5C. Accordingly, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may provide means for receiving a TCI configuration message from the base station 102 in response to the TCI report, where the TCI configuration message indicates a first set of TCI of the plurality of TCIs for a PDCCH transmission.

At 806, the method 800 may include skip monitoring, based at least in part on the TCI configuration message, a CORESET associated with a second set of TCI of the plurality of TCIs. For example, in an aspect, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may skip monitoring, based at least in part on the TCI configuration message, a CORESET associated with a second set of TCI of the plurality of TCIs. For example, in an aspect, the UE 104 may skip monitoring CORESETs associated with TCI #3 and TCI #4, as in FIG. 5C. Accordingly, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may provide means for skip monitoring, based at least in part on the TCI configuration message, a CORESET associated with a second set of TCI of the plurality of TCIs.

Optionally, in an aspect, at block 810, the method 800 may further include turning off a UE panel associated with the second set of TCI. For example, in an aspect, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may turn off a UE panel associated with the second set of TCI. For example, in an aspect, the UE may turn off the second UE panel 145 as in FIG. 5C. Accordingly, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may provide means for turning off a UE panel associated with the second set of TCI.

Optionally, in an aspect, the first set of TCI is different than the second set of TCI. For example, in an aspect, the first set of TCI include TCI #1 and TCI #2, and the second set of TCI includes TCI #3 and TCI #4, as in FIG. 5C.

Optionally, in an aspect, the TCI report indicates that each TCI of the plurality of TCIs is associated with only one UE panel of the one or more UE panels.

Optionally, in an aspect, the TCI report indicates that at least one TCI of the plurality of TCIs is associated with more than one UE panel.

Optionally, in an aspect, the TCI report indicates, for a first TCI of the plurality of TCIs, a single association, a multiple association, and a confidence level of the single association, where the single association identifies the first TCI being associated with a first UE panel, where the multiple association indicates the first TCI being associated with the first UE panel and at least a second UE panel, and where the confidence level identifies a UE confidence in reliably receiving the first TCI using only the first UE panel.

Optionally, in an aspect, the TCI report includes a UE capability indicating whether the UE is capable of a simultaneous reception of one or more CORESETs of one or more TCIs of the plurality of TCIs via more than one UE panel of the one or more UE panels.

Optionally, in an aspect, the UE is capable of reception of one or more CORESETs of a single TCI of the plurality of TCIs via one of the one or more UE panels, where the UE capability indicates that the UE is incapable of the simultaneous reception.

Optionally, in an aspect, the UE is capable of searching CORESETs corresponding to only one TCI for PDCCH monitoring by using multiple UE panels, where the UE capability indicates that the UE is capable of the simultaneous reception.

Optionally, in an aspect, the UE is capable of searching CORESETs corresponding to multiple TCIs for PDCCH monitoring by using multiple UE panels, where the UE capability indicates that the UE is capable of the simultaneous reception.

Optionally, in an aspect, the TCI configuration message indicates a TCI index of a TCI that is excluded from the first set of TCI.

Optionally, in an aspect, the TCI configuration message indicates an excluded group index associated with one or more TCI indices of an excluded set of TCI excluded from the first set of TCI, where the excluded group index corresponds to an excluded UE panel index, where the skip monitoring includes skip monitoring responsive to at least based on the excluded group index.

Optionally, in an aspect, receiving the TCI configuration message at 804 includes receiving within a signaling of TCI configurations via RRC.

Optionally, in an aspect, receiving the TCI configuration message at 804 includes receiving within signaling of activation/deactivation of one or more corresponding TCIs via MAC CE.

Optionally, in an aspect, receiving the TCI configuration message at 804 includes receiving a dynamic indication via a DCI.

Optionally, in an aspect, the dynamic indication includes a PDCCH skipping signal.

Optionally, in an aspect, receiving the TCI configuration message at 804 includes receiving within a signaling configured for UE power saving.

Optionally, in an aspect, for example, block 806 may further include block 808. In this aspect, at block 808, the method 800 may further include determining whether to use a power saving mode or a high performance mode. For example, in an aspect, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may determine whether to use a power saving mode or a high performance mode. Accordingly, UE 104, 750, power saving component 140, first UE panel 144, second UE panel 145, memory 760, antenna 752, TX processor 768, RX processor 756, controller/processor 759, modem 1014, memory 1016, UE panel(s) 146, antenna 1065, RF front end 1088, transceiver 1002, and/or processor 1012 may provide means for determining whether to use a power saving mode or a high performance mode.

Optionally, in an aspect, for example, the skip monitoring at 806 is performed in response to determining to use the power saving mode.

Figure 9:
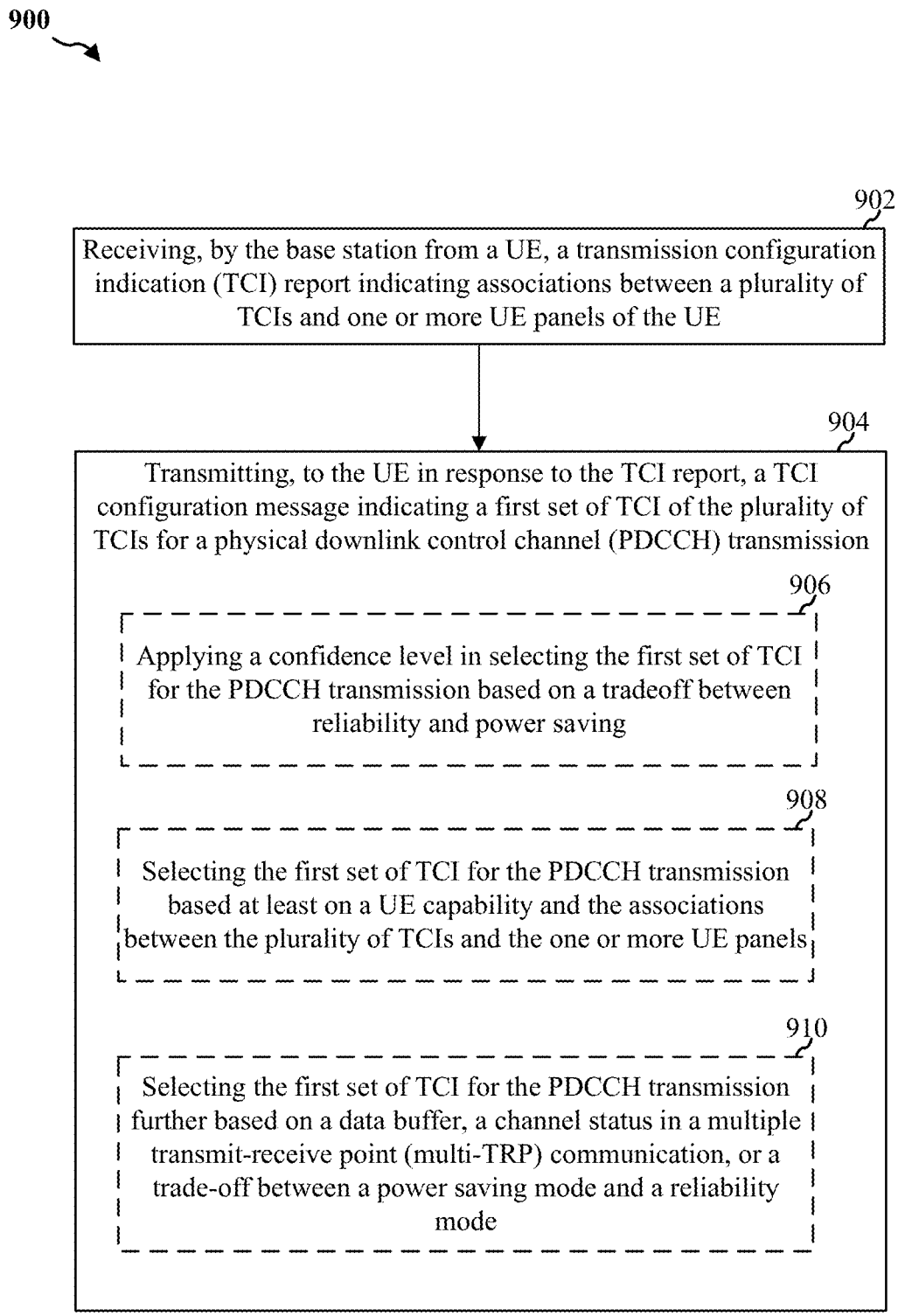
FIG. 9 is a flowchart of an example method of wireless communication by a base station, according to some aspects of the present disclosure.

FIG. 9 is a flowchart of a method 900 of wireless communication that may be performed by a base station such as the base station 102 (FIG. 1 above or FIG. 11 below) or the base station 710 (FIG. 7 above). In an aspect, for example, the base station 102 or the base station 710 may perform the functions described in the method 900 using one or more of the components described with reference to FIG. 1 or FIG. 7 above or in FIG. 11 below, such as power saving component 198, memory 776, antenna 720, TX processor 716, RX processor 770, controller/processor 775, modem 1114, power saving component 198, antenna 1165, RF front end 1188, transceiver 1102, processor 1112, and/or memory 1116.

At 902, the method 900 includes receiving, by the base station from a UE, a TCI report indicating associations between a plurality of TCIs and one or more UE panels of the UE. For example, in an aspect, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may receive a TCI report from the UE 104, where the TCI report indicates associations between a plurality of TCIs and one or more UE panels of the UE 104, such as the first UE panel 144 and the second UE panel 145. For example, in an aspect, the TCI report may indicate that TCI #1 and TCI #2 are associated with the first UE panel 144, and TCI #3 and TCI #4 are associated with the second UE panel 145, as in FIGS. 5A-5C. Accordingly, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may provide means for receiving a TCI report from the UE 104, where the TCI report indicates associations between a plurality of TCIs and one or more UE panels of the UE 104, such as the first UE panel 144 and the second UE panel 145.

At 904, the method 900 includes transmitting, to the UE in response to the TCI report, a TCI configuration message indicating a first set of TCI of the plurality of TCIs for a PDCCH transmission. For example, in an aspect, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may transmit a TCI configuration message to the UE 104 in response to the TCI report, where the TCI configuration message indicates a first set of TCI of the plurality of TCIs for a PDCCH transmission. For example, in an aspect, the TCI configuration message may indicate that TCI #1 and TCI #2 are used for PDCCH transmission, as in FIG. 5C. Accordingly, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may provide means for transmitting a TCI configuration message to the UE 104 in response to the TCI report, where the TCI configuration message indicates a first set of TCI of the plurality of TCIs for a PDCCH transmission.

Optionally, in an aspect, the TCI report indicates that each TCI of the plurality of TCIs is associated with only one UE panel of the one or more UE panels.

Optionally, in an aspect, the TCI report indicates that at least one TCI of the plurality of TCIs is associated with more than one UE panel.

Optionally, in an aspect, the TCI report indicates, for a first TCI of the plurality of TCIs, a single association, a multiple association, and a confidence level of the single association, where the single association identifies the first TCI being associated with a first UE panel, where the multiple association indicates the first TCI being associated with the first UE panel and at least a second UE panel, and where the confidence level identifies a UE confidence in reliably receiving the first TCI using only the first UE panel.

Optionally, in an aspect, block 904 may further include block 906. In this aspect, at block 906, the method 900 may further include applying the confidence level in selecting the first set of TCI for the PDCCH transmission based on a tradeoff between reliability and power saving. For example, in an aspect, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may apply the confidence level in selecting the first set of TCI for the PDCCH transmission based on a tradeoff between reliability and power saving. Accordingly, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may provide means for applying the confidence level in selecting the first set of TCI for the PDCCH transmission based on a tradeoff between reliability and power saving.

Optionally, in an aspect, the TCI report includes a UE capability indicating whether the UE is capable of a simultaneous reception of one or more CORESETs of one or more TCIs of the plurality of TCIs via more than one UE panel of the one or more UE panels.

Optionally, in an aspect, the UE is capable of reception of one or more CORESETs of a single TCI of the plurality of TCIs via one of the one or more UE panels, where the UE capability indicates that the UE is incapable of the simultaneous reception.

Optionally, in an aspect, the UE is capable of searching CORESETs corresponding to only one TCI for PDCCH monitoring by using multiple UE panels, where the UE capability indicates that the UE is capable of the simultaneous reception.

Optionally, in an aspect, the UE is capable of searching CORESETs corresponding to multiple TCIs for PDCCH monitoring by using multiple UE panels, where the UE capability indicates that the UE is capable of the simultaneous reception.

Optionally, in an aspect, block 904 may further include block 908. In this aspect, at block 908, the method 900 may further include selecting the first set of TCI for the PDCCH transmission based at least on the UE capability and the associations between the plurality of TCIs and the one or more UE panels. For example, in an aspect, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may select the first set of TCI for the PDCCH transmission based at least on the UE capability and the associations between the plurality of TCIs and the one or more UE panels. Accordingly, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may provide means for selecting the first set of TCI for the PDCCH transmission based at least on the UE capability and the associations between the plurality of TCIs and the one or more UE panels.

Optionally, in an aspect, block 904 may further include block 910. In this aspect, at block 910, the method 900 may further include selecting the first set of TCI for the PDCCH transmission further based on a data buffer, a channel status in a multi-TRP communication, or a trade-off between a power saving mode and a reliability mode. For example, in an aspect, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may select the first set of TCI for the PDCCH transmission further based on a data buffer, a channel status in a multi-TRP communication, or a trade-off between a power saving mode and a reliability mode. Accordingly, base station 102, 710, power saving component 198, memory 776, antenna 720, TX processor 716, RX processor 770, controller/processor 775, modem 1114, memory 1116, antenna 1165, RF front end 1188, transceiver 1102, and/or processor 1112 may provide means for selecting the first set of TCI for the PDCCH transmission further based on a data buffer, a channel status in a multi-TRP communication, or a trade-off between a power saving mode and a reliability mode.

Optionally, in an aspect, the TCI configuration message indicates a TCI index of a TCI that is excluded from the first set of TCI.

Optionally, in an aspect, the TCI configuration message indicates an excluded group index associated with one or more TCI indices of an excluded set of TCI excluded from the first set of TCI, where the excluded group index corresponds to an excluded UE panel index, where the skip monitoring includes skip monitoring responsive to at least based on the excluded group index.

Optionally, in an aspect, transmitting the TCI configuration message at block 904 includes transmitting within a signaling of TCI configurations via RRC.

Optionally, in an aspect, transmitting the TCI configuration message at 904 includes transmitting within signaling of activation/deactivation of one or more corresponding TCIs via MAC CE.

Optionally, in an aspect, transmitting the TCI configuration message at 904 includes transmitting a dynamic indication via a DCI.

Optionally, in an aspect, the dynamic indication includes a PDCCH skipping signal.

Optionally, in an aspect, transmitting the TCI configuration message at 904 includes transmitting within a signaling configured for UE power saving.

Figure 10:
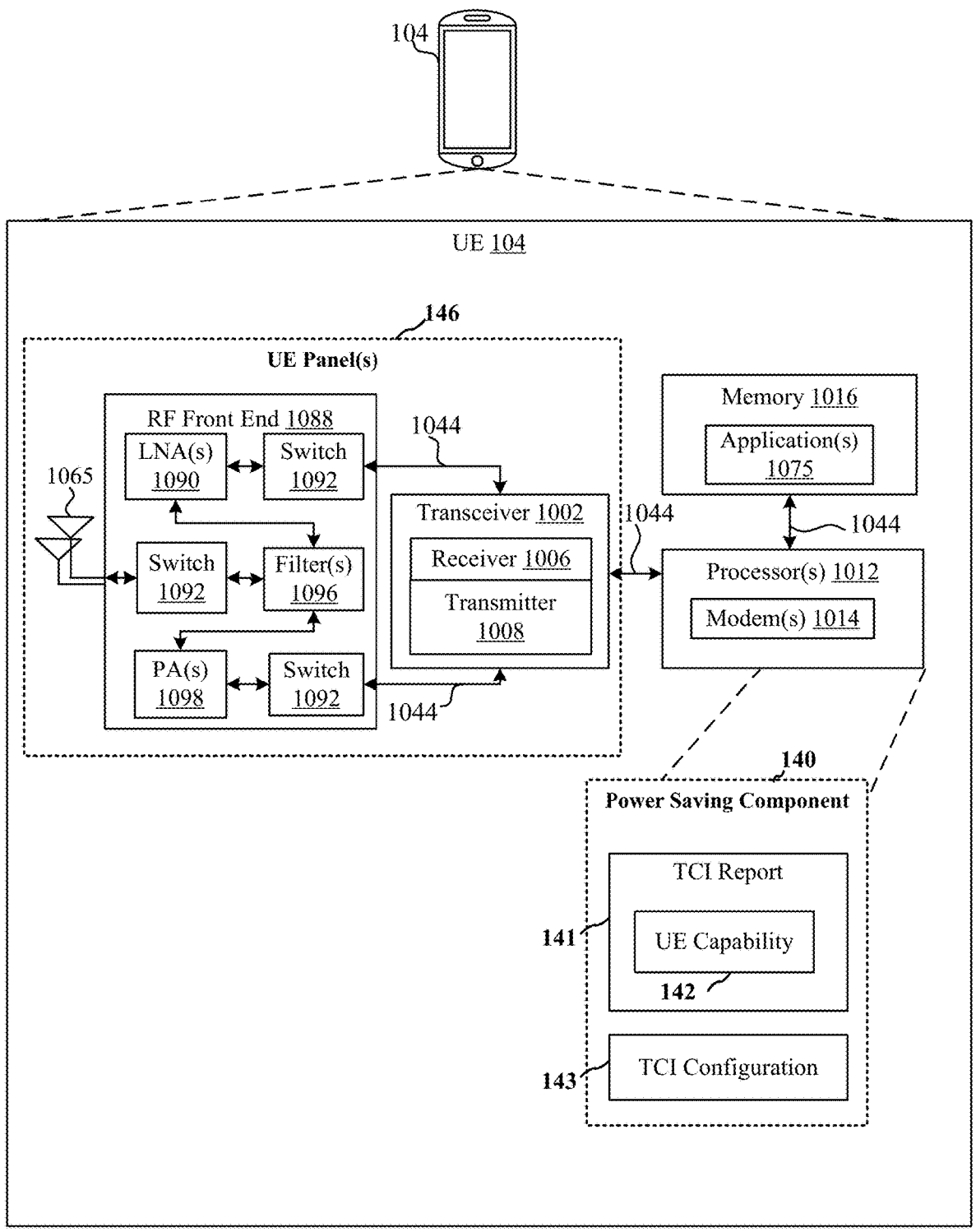
FIG. 10 is a schematic diagram of example components of the UE of FIG. 1, according to some aspects of the present disclosure.

Referring to FIG. 10, one example of an implementation of UE 104 may include a variety of components, some of which have already been described above, but including components such as one or more UE panels 146 (e.g., first UE panel 144 and second UE panel 145 in FIG. 1) and one or more processors 1012 and memory 1016 and transceiver 1002 in communication via one or more buses 1044, which may operate in conjunction with modem 1014, and power saving component 140 to enable one or more of the functions described herein related to UE power saving. Further, the one or more processors 1012, modem 1014, memory 1016, transceiver 1002, RF front end 1088 and one or more antennas 1065 may be configured to support voice and/or data calls (simultaneously or non-simultaneously) in one or more radio access technologies. The antennas 1065 may include one or more antennas, antenna elements, and/or antenna arrays.

In an aspect, the one or more processors 1012 may include a modem 1014 that uses one or more modem processors. The various functions related to power saving component 140 may be included in modem 1014 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with power saving component 140 may be performed by transceiver 1002.

Also, memory 1016 may be configured to store data used herein and/or local versions of applications 1075, power saving component 140 and/or one or more of subcomponents thereof being executed by at least one processor 1012. Memory 1016 may include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining power saving component 140 and/or one or more of subcomponents thereof, and/or data associated therewith, when UE 104 is operating at least one processor 1012 to execute power saving component 140 and/or one or more subcomponents thereof.

Transceiver 1002 may include at least one receiver 1006 and at least one transmitter 1008. Receiver 1006 may include hardware, firmware, and/or software code executable by a processor for receiving data, the code including instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code including instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, LNA 1090 may amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 may be used by RF front end 1088 to filter a received signal to obtain an input RF signal. Similarly, in an aspect, for example, a respective filter 1096 may be used to filter an output from a respective PA 1098 to produce an output signal for transmission. In an aspect, each filter 1096 may be connected to a specific LNA 1090 and/or PA 1098. In an aspect, RF front end 1088 may use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 1014 may configure transceiver 1002 to operate at a specified frequency and power level based on the UE configuration of the UE 104 and the communication protocol used by modem 1014.

In an aspect, modem 1014 may be a multiband-multimode modem, which can process digital data and communicate with transceiver 1002 such that the digital data is sent and received using transceiver 1002. In an aspect, modem 1014 may be multiband and be configured to support multiple frequency bands for a specific communications protocol. In an aspect, modem 1014 may be multimode and be configured to support multiple operating networks and communications protocols. In an aspect, modem 1014 may control one or more components of UE 104 (e.g., RF front end 1088, transceiver 1002) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 11:
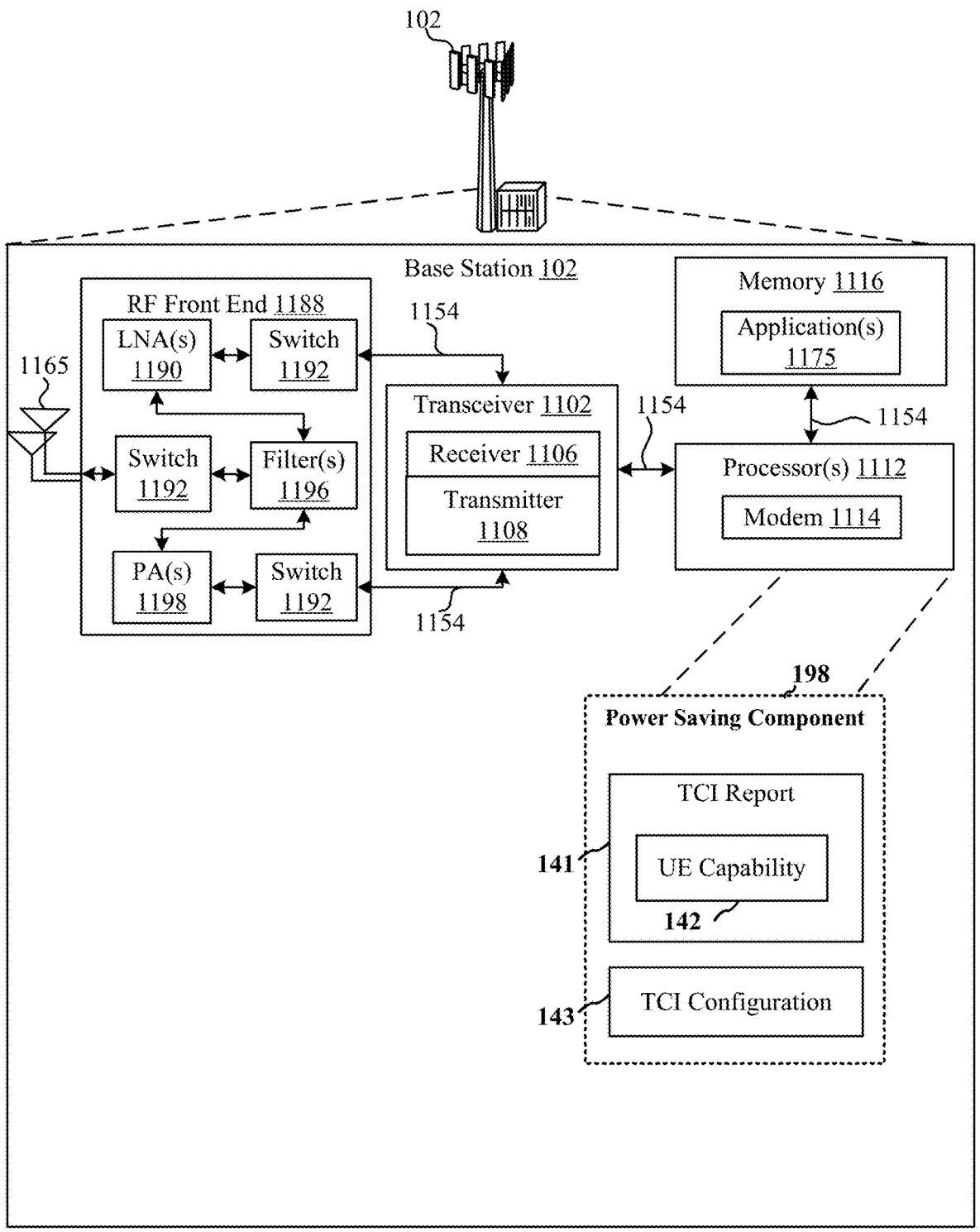
FIG. 11 is a schematic diagram of example components of the base station of FIG. 1, according to some aspects of the present disclosure.

Referring to FIG. 11, one example of an implementation of base station 102 may include a variety of components, some of which have already been described above, but including components such as one or more processors 1112 and memory 1116 and transceiver 1102 in communication via one or more buses 1154, which may operate in conjunction with modem 1114 and power saving component 198 to enable one or more of the functions described herein related to UE power saving.

The transceiver 1102, receiver 1106, transmitter 1108, one or more processors 1112, memory 1116, applications 1175, buses 1154, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    transmitting, by the UE to a base station, a transmission configuration indication (TCI) report indicating associations between a plurality of TCIs and one or more UE panels of the UE, wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel;
    receiving, from the base station in response to the TCI report, a TCI configuration message indicating a first set of TCI of the plurality of TCIs for a physical downlink control channel (PDCCH) transmission; and
    skip monitoring, based at least in part on the TCI configuration message, a control resource set (CORESET) associated with a second set of TCI of the plurality of TCIs.

2. The method of claim 1, wherein the first set of TCI is different than the second set of TCI.

3. The method of claim 1, further comprising:
    turning off a UE panel associated with the second set of TCI.

4. The method of claim 1, wherein the TCI report indicates that each TCI of the plurality of TCIs is associated with only one UE panel of the one or more UE panels.

5. The method of claim 1, wherein the TCI report indicates that at least one TCI of the plurality of TCIs is associated with more than one UE panel.

6. The method of claim 1, wherein the confidence level identifies a UE confidence in reliably receiving the first TCI using only the first UE panel.

7. The method of claim 1, wherein the TCI report includes a UE capability indicating whether the UE is capable of a simultaneous reception of one or more CORESETs of one or more TCIs of the plurality of TCIs via more than one UE panel of the one or more UE panels.

8. The method of claim 7, wherein the UE is capable of reception of one or more CORESETs of a single TCI of the plurality of TCIs via one of the one or more UE panels, wherein the UE capability indicates that the UE is incapable of the simultaneous reception.

9. The method of claim 7, wherein the UE is capable of searching CORESETs corresponding to only one TCI for PDCCH monitoring by using multiple UE panels, wherein the UE capability indicates that the UE is capable of the simultaneous reception.

10. The method of claim 7, wherein the UE is capable of searching CORESETs corresponding to multiple TCIs for PDCCH monitoring by using multiple UE panels, wherein the UE capability indicates that the UE is capable of the simultaneous reception.

11. The method of claim 1, wherein the TCI configuration message indicates a TCI index of a TCI that is excluded from the first set of TCI.

12. The method of claim 1, wherein the TCI configuration message indicates an excluded group index associated with one or more TCI indices of an excluded set of TCI excluded from the first set of TCI, wherein the excluded group index corresponds to an excluded UE panel index, wherein the skip monitoring is further based on the excluded group index.

13. The method of claim 1, wherein receiving the TCI configuration message comprises receiving within a signaling of TCI configurations via radio resource control (RRC).

14. The method of claim 1, wherein receiving the TCI configuration message comprises receiving within signaling of activation/deactivation of one or more corresponding TCIs via media access control (MAC) control element (CE).

15. The method of claim 1, wherein receiving the TCI configuration message comprises receiving a dynamic indication via a downlink control information (DCI).

16. The method of claim 15, wherein the dynamic indication comprises a PDCCH skipping signal.

17. The method of claim 1, wherein receiving the TCI configuration message comprises receiving within a signaling configured for UE power saving.

18. The method of claim 1, further comprising:
    determining whether to use a power saving mode or a high performance mode; and
    wherein the skip monitoring is performed in response to determining to use the power saving mode.

19. A user equipment (UE) for wireless communication, comprising:
    a memory; and at least one processor coupled to the memory and configured to:
transmit, by the UE to a base station, a transmission configuration indication (TCI) report indicating associations between a plurality of TCIs and one or more UE panels of the UE, wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel;
receive, from the base station in response to the TCI report, a TCI configuration message indicating a first set of TCI of the plurality of TCIs for a physical downlink control channel (PDCCH) transmission; and
skip monitoring, based at least in part on the TCI configuration message, a control resource set (CORESET) associated with a second set of TCI of the plurality of TCIs.

20. A method of wireless communication by a base station, comprising:
receiving, by the base station from a user equipment (UE), a transmission configuration indication (TCI) report indicating associations between a plurality of TCIs and one or more UE panels of the UE, wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel; and
transmitting, to the UE in response to the TCI report, a TCI configuration message indicating a first set of TCI of the plurality of TCIs for a physical downlink control channel (PDCCH) transmission.

21. The method of claim 20, wherein the TCI report indicates that each TCI of the plurality of TCIs is associated with only one UE panel of the one or more UE panels.

22. The method of claim 20, wherein the TCI report indicates that at least one TCI of the plurality of TCIs is associated with more than one UE panel.

23. The method of claim 20, wherein the confidence level identifies a UE confidence in reliably receiving the first TCI using only the first UE panel, the method further comprising:
applying the confidence level in selecting the first set of TCI for the PDCCH transmission based on a tradeoff between reliability and power saving.

24. The method of claim 20, wherein the TCI report includes a UE capability indicating whether the UE is capable of a simultaneous reception of one or more CORESETs of one or more TCIs of the plurality of TCIs via more than one UE panel of the one or more UE panels, the method further comprising:
selecting the first set of TCI for the PDCCH transmission based at least on the UE capability, the associations between the plurality of TCIs and the one or more UE panels, a data buffer, a channel status in a multiple transmit-receive point (multi-TRP) communication, or a trade-off between a power saving mode and a reliability mode.

25. The method of claim 20, wherein the TCI configuration message indicates a TCI index of a TCI that is excluded from the first set of TCI.

26. The method of claim 20, wherein the TCI configuration message indicates an excluded group index associated with one or more TCI indices of an excluded set of TCI excluded from the first set of TCI, wherein the excluded group index corresponds to an excluded UE panel index.

27. The method of claim 20, wherein transmitting the TCI configuration message comprises transmitting within a signaling of TCI configurations via radio resource control (RRC) or within signaling of activation/deactivation of one or more corresponding TCIs via media access control (MAC) control element (CE).

28. The method of claim 20, wherein transmitting the TCI configuration message comprises transmitting a dynamic indication via a downlink control information (DCI), wherein the dynamic indication comprises a PDCCH skipping signal.

29. The method of claim 20, wherein transmitting the TCI configuration message comprises transmitting within a signaling configured for UE power saving.

30. A base station for wireless communication, comprising:
a memory; and
at least one processor coupled to the memory and configured to:
receive, by the base station from a user equipment (UE), a transmission configuration indication (TCI) report indicating associations between a plurality of TCIs and one or more UE panels of the UE, wherein the TCI report indicates, for a first TCI of the plurality of TCIs, a single association, a multiple association, and a confidence level of the single association, wherein the single association identifies the first TCI being associated with a first UE panel, wherein the multiple association indicates the first TCI being associated with the first UE panel and at least a second UE panel; and
transmit, to the UE in response to the TCI report, a TCI configuration message indicating a first set of TCI of the plurality of TCIs for a physical downlink control channel (PDCCH) transmission.

* * * * *